US009678202B2

(12) United States Patent
Nagy

(10) Patent No.: US 9,678,202 B2
(45) Date of Patent: Jun. 13, 2017

(54) APPARATUS FOR MEASURING THE POSITION OF A VEHICLE OR A SURFACE THEREOF

(71) Applicant: Kapsch TrafficCom AG, Vienna (AT)

(72) Inventor: Oliver Nagy, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 528 days.

(21) Appl. No.: 14/267,669

(22) Filed: May 1, 2014

(65) Prior Publication Data

US 2014/0333472 A1    Nov. 13, 2014

(30) Foreign Application Priority Data

May 13, 2013   (EP) .................................... 13167404

(51) Int. Cl.
*G01S 13/91*    (2006.01)
*G08G 1/01*    (2006.01)
(Continued)

(52) U.S. Cl.
CPC ............ *G01S 13/48* (2013.01); *G01S 13/003* (2013.01); *G01S 13/878* (2013.01); *G01S 13/91* (2013.01);
(Continued)

(58) Field of Classification Search
CPC .......... G01S 13/91; G01S 13/92; G01S 7/292; G01S 13/50; G01S 7/35;
(Continued)

(56) References Cited

U.S. PATENT DOCUMENTS 4,717,915 A * 1/1988 Goede ................... G08G 1/054
                                                   342/106
4,743,908 A * 5/1988 Brassfield ............. G01S 13/583
                                                   342/113

(Continued)

FOREIGN PATENT DOCUMENTS

DE          19737868 A1    3/1998
EP          0636900 A2     2/1995
(Continued)

OTHER PUBLICATIONS

Extended European Search Report Received for EP Patent Application No. 13167404.6 mailed on Feb. 11, 2014, 12 pages.
(Continued)

*Primary Examiner* — Peter Bythrow
(74) *Attorney, Agent, or Firm* — Fiala & Weaver P.L.L.C.

(57) ABSTRACT

An apparatus is disclosed for measuring the position of a vehicle or a surface thereof on a roadway. The apparatus comprises at least one radar transmitter, which is arranged in a transmitting position above the plane of the roadway and transmits radar beams downwardly, a plurality of radar receivers, which are distributed above the plane of the roadway in different receiving positions at distances from one another, receive reflections of the radar beams from beneath, and convert the reflections into a received signal, and an evaluation device, which is connected to the radar transmitter and the radar receivers and is configured to measure the said position from the transmitting position, the receiving positions and the received signals.

20 Claims, 4 Drawing Sheets

(51) Int. Cl.
*G01S 13/48* (2006.01)
*G01S 13/00* (2006.01)
*G01S 13/87* (2006.01)
G01S 7/41 (2006.01)
G01S 7/292 (2006.01)
G08G 1/015 (2006.01)
G07B 15/06 (2011.01)

(52) U.S. Cl.
CPC ............... *G08G 1/01* (2013.01); *G01S 7/292* (2013.01); *G01S 7/41* (2013.01); *G07B 15/06* (2013.01); *G08G 1/015* (2013.01)

(58) Field of Classification Search
CPC ............ G01S 7/41–7/412; G08G 1/00; G08G 1/01–1/0116; G08G 1/0125–1/0145; G08G 1/015; G08G 1/017; G08G 1/0175; G08G 1/052; G08G 1/054
USPC .................................................. 342/70–72
See application file for complete search history.

(56) References Cited

U.S. PATENT DOCUMENTS

| | | | | |
|---|---|---|---|---|
| 4,866,438 A * | 9/1989 | Knisch | G08G 1/054 | 340/936 |
| 5,066,950 A * | 11/1991 | Schweitzer | G08G 1/054 | 340/936 |
| 5,266,954 A * | 11/1993 | Orlowski | G01S 13/62 | 342/114 |
| 5,402,346 A * | 3/1995 | Lion | G01S 13/64 | 340/933 |
| 5,510,794 A * | 4/1996 | Asbury | G01S 13/24 | 342/42 |
| 5,694,134 A * | 12/1997 | Barnes | H01G 7/06 | 333/161 |
| 5,717,390 A * | 2/1998 | Hasselbring | G01S 7/411 | 235/379 |
| 5,793,491 A * | 8/1998 | Wangler | G01S 7/4802 | 356/398 |
| 5,969,641 A * | 10/1999 | Nakamura | G08G 1/017 | 235/384 |
| 6,034,625 A * | 3/2000 | Mitsuno | G08G 1/017 | 340/539.1 |
| 6,138,912 A * | 10/2000 | Mitsuno | G08G 1/017 | 235/384 |
| 6,160,494 A * | 12/2000 | Sodi | G08G 1/052 | 340/928 |
| 6,177,885 B1 * | 1/2001 | Weil | G08G 1/0104 | 340/934 |
| 6,195,019 B1 * | 2/2001 | Nagura | G07B 15/063 | 235/384 |
| 6,266,627 B1 * | 7/2001 | Gatsonides | G01S 13/582 | 340/936 |
| 6,272,443 B1 * | 8/2001 | Motzko | B60W 40/068 | 702/142 |
| 6,304,321 B1 * | 10/2001 | Wangler | G01S 17/89 | 356/398 |
| 6,614,536 B1 * | 9/2003 | Doemens | G01S 7/4802 | 356/28 |
| 6,657,554 B1 * | 12/2003 | Terashima | G07B 15/063 | 340/928 |
| 6,781,523 B2 * | 8/2004 | Matsui | G07B 15/063 | 340/910 |
| 7,038,614 B1 * | 5/2006 | Aker | G01S 13/583 | 342/70 |
| 7,190,306 B2 * | 3/2007 | Janssen | G08G 1/01 | 342/104 |
| 7,405,676 B2 * | 7/2008 | Janssen | G08G 1/01 | 250/224 |
| 7,426,450 B2 * | 9/2008 | Arnold | G01S 13/583 | 702/142 |
| 7,501,976 B2 * | 3/2009 | Manor | G01S 13/4445 | 340/933 |
| 8,035,546 B2 * | 10/2011 | Nalezinski | G01S 7/021 | 342/104 |
| 8,115,670 B2 * | 2/2012 | Klein | G01S 13/584 | 340/936 |
| 8,299,957 B2 * | 10/2012 | Tseng | G01S 7/415 | 342/104 |
| 8,593,336 B2 * | 11/2013 | Kajiki | G01S 7/4017 | 342/165 |
| 8,665,113 B2 * | 3/2014 | Arnold | G01S 13/48 | 340/907 |
| 2002/0140924 A1 * | 10/2002 | Wangler | G01S 7/4802 | 356/28 |
| 2004/0008514 A1 | 1/2004 | Lee et al. | | |
| 2004/0227661 A1 * | 11/2004 | Godsy | G01S 13/325 | 342/70 |
| 2005/0046597 A1 * | 3/2005 | Hutchison | G08G 1/07 | 340/917 |
| 2006/0022866 A1 | 2/2006 | Walton et al. | | |
| 2006/0066472 A1 * | 3/2006 | Janssen | G08G 1/01 | 342/104 |
| 2006/0273950 A1 | 12/2006 | Ho et al. | | |
| 2007/0096943 A1 * | 5/2007 | Arnold | G01S 13/34 | 340/907 |
| 2008/0169961 A1 | 7/2008 | Steinway et al. | | |
| 2008/0278365 A1 * | 11/2008 | Klein | G01S 13/584 | 342/104 |
| 2008/0278366 A1 * | 11/2008 | Behrens | G01S 7/41 | 342/109 |
| 2009/0102699 A1 * | 4/2009 | Behrens | G01S 13/42 | 342/109 |
| 2011/0221628 A1 * | 9/2011 | Kamo | G01S 7/295 | 342/70 |
| 2011/0291876 A1 * | 12/2011 | Hong | G01S 13/589 | 342/113 |
| 2012/0113437 A1 * | 5/2012 | Griesser | G01B 11/2433 | 356/625 |
| 2012/0133547 A1 * | 5/2012 | MacDonald | G01S 13/931 | 342/70 |
| 2013/0099943 A1 * | 4/2013 | Subramanya | G01S 7/2926 | 340/933 |
| 2013/0151135 A1 * | 6/2013 | Aubrey | G08G 1/00 | 701/118 |
| 2013/0222177 A1 * | 8/2013 | Kajiki | G01S 13/66 | 342/109 |
| 2014/0049419 A1 * | 2/2014 | Lehning | G08G 1/0116 | 342/107 |
| 2014/0176360 A1 * | 6/2014 | Lehning | G01S 13/867 | 342/66 |

FOREIGN PATENT DOCUMENTS

| | | |
|---|---|---|
| WO | 94/28377 A1 | 12/1994 |
| WO | 2005/093708 A1 | 10/2005 |
| WO | 2011/139408 A1 | 11/2011 |

OTHER PUBLICATIONS

Partial European Search Report Received for EP Patent Application No. 13167404.6 mailed on Nov. 15, 2013, 6 pages.
Patent Examination Report received for New Zealand IP No. 623023, Mailed on Apr. 2, 2014, 2 pages.

* cited by examiner

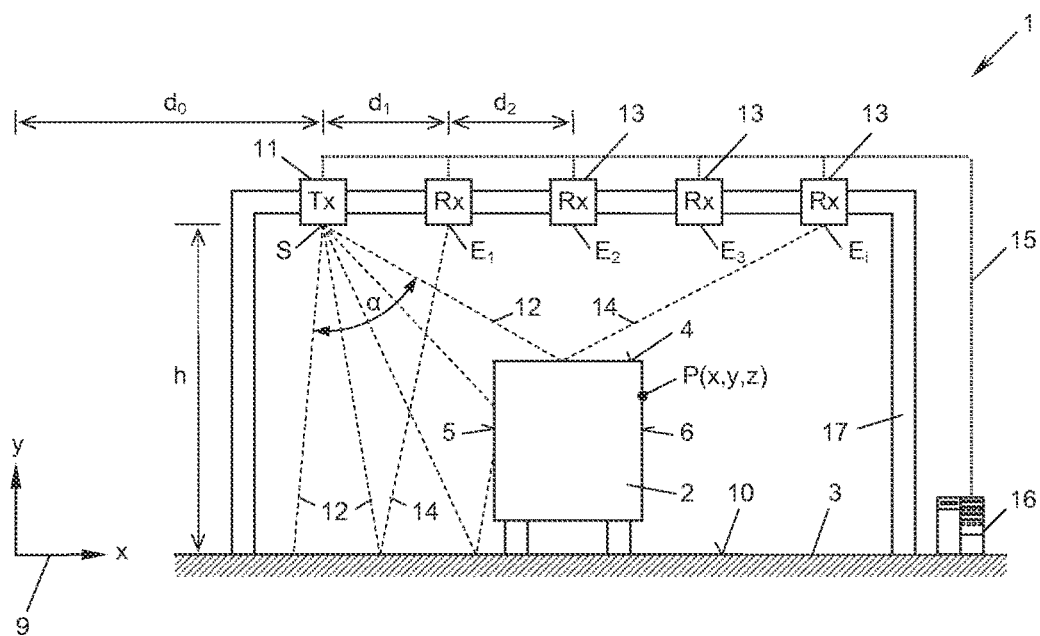
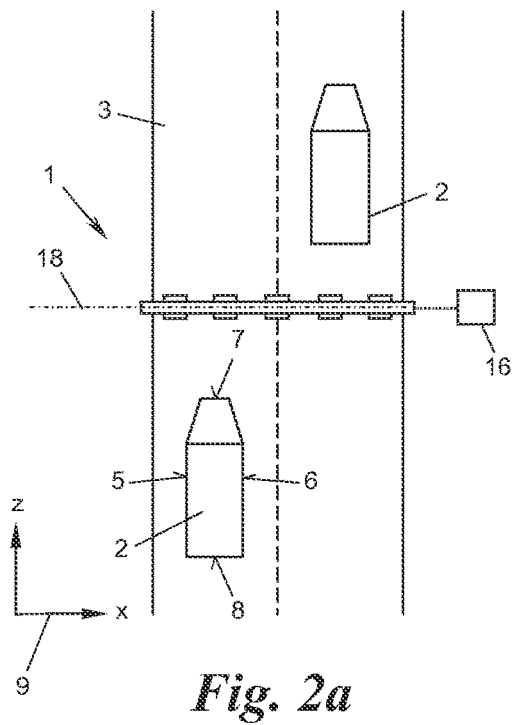 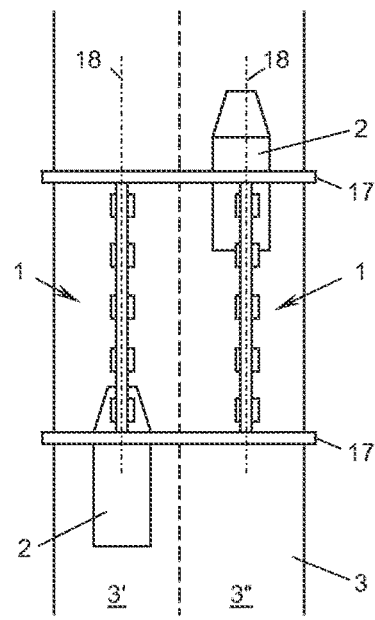
*Fig. 1*
*Fig. 2a*      *Fig. 2b*

APPARATUS FOR MEASURING THE POSITION OF A VEHICLE OR A SURFACE THEREOF

CROSS-REFERENCE TO RELATED APPLICATION(S)

This application claims priority to European Patent Application No. 13 167 404.6, filed on May 13, 2013, the entirety of which is incorporated by reference herein.

BACKGROUND

Technical Field

The present subject matter relates to an apparatus for measuring the position of a vehicle or a surface thereof on a roadway.

Background Art

The measurement of the position of vehicles is important for many tasks in the field of traffic control, traffic monitoring and traffic billing, for example in order to determine the lane used by a vehicle at an electronic traffic control point or tollbooth or also in order to identify the longitudinal position of a vehicle along the roadway so as to be able to assign the vehicle unambiguously to the image of a traffic monitoring camera. The measurement of the position of a surface of the vehicle, for example the roof or side faces thereof, is of significance in order to determine the size of the vehicle and therefore classify said vehicle, for example in order to determine whether the vehicle is a passenger vehicle or lorry, for example so as to be able to check and enforce traffic restrictions or toll fees dependent on vehicle class.

Predominantly optical systems, such as laser scanners or video cameras, are currently used for position measurement. These systems are reliant on good visibility and are therefore highly dependent on the weather; they often fail in rain, snow or spray. The optics of laser scanners and video cameras also requires frequent cleaning in order to remain ready for use, and these systems have a limited service life and a limited temperature range due to mechanically moved parts.

In sub-areas such as traffic flow monitor systems, radar systems are also currently used which, from a raised point, for example an antenna mast next to a motorway, detect moved vehicles by means of Doppler radar and can track the movement of said vehicles in a radar image. The accuracy of the position measurement of such radar systems is limited, and the Doppler evaluation of the vehicle speeds requires a high processing effort in order to create the traffic flow image.

BRIEF SUMMARY

An object of the disclosed subject matter is to create novel apparatus and methods for measuring the position of vehicles and/or surfaces thereof, said apparatus and methods being less susceptible to failure than the known optical systems and being simpler, more cost effective and more accurate than the known radar systems.

This object is achieved by an apparatus of the type mentioned above, comprising:

at least one radar transmitter, which is arranged in a transmitting position above the plane of the roadway and transmits radar beams downwardly, a plurality of radar receivers, which are distributed above the plane of the roadway in different receiving positions at distances from one another, receive reflections of the radar beams from beneath and convert said reflections into a received signal, and an evaluation device, which is connected to the radar transmitter and the radar receivers and which is configured to measure the said position from the transmitting position, the receiving position and the received signals.

In an embodiment, a plurality of spatially distributed radar receivers is used in order to evaluate the radar beams of a single radar transmitter that have been reflected by a vehicle to be measured. An abundance of position information concerning the vehicle on the roadway can be derived from the known geometric arrangement between radar transmitter on the one hand and radar receivers on the other hand, more specifically just by comparison or joint evaluation of the received signals of the radar receivers without the need for complicated Doppler, time-of-flight or phase interference measurements.

In the simplest case, an evaluation of the relative signal strengths of the received signals of the radar receivers is sufficient to obtain information concerning the position of the vehicle or a surface thereof with respect to the radar receivers. The more radar receivers that are provided, the more accurate is the spatial resolution of the position measurement. The accuracy of the position measurement apparatus is not achieved here by complicated, computationally intensive evaluations of the received signals based on signal analysis, but by simple trigonometric calculations and a simple evaluation of the received signal strengths. The radar receivers can thus be formed in a very simple, lightweight and cost-effective manner, and therefore a large number of such radar receivers can be used.

In accordance with an example embodiment, the radar transmitter and the radar receivers lie in a common plane crossing the roadway and may, for example, be mounted on a mounting gantry spanning the roadway transversely. Positions of the vehicle or of a surface thereof can thus be determined in this plane with high accuracy and using simple computational means, for example the lane used by the vehicle, the height of the roof of the vehicle with respect to the roadway, or the position of a side face of the vehicle. In an alternative embodiment the radar transmitter and radar receivers could also lie in a plane oriented along the roadway or running at an angle to the roadway, such that the position of the vehicle or of an end face of the vehicle can also be determined in the longitudinal direction of the roadway.

In simple embodiments the radar transmitter may be a continuous wave radar transmitter (CW radar) and the evaluation device, for example, evaluates just the signal strengths of the received signals. The evaluation device may optionally additionally perform interference measurements for distance measurement.

In a further embodiment, the radar transmitter, controlled by transmitted pulses, transmits pulsed radar beams and the received signals consequently contain received pulses, and the evaluation device is configured to take into account for said position measuring only those received signals of which the received pulses lie within a predefined time window after a transmitted pulse. The time windows (range gates) can be set such that multiple reflections of the radar beams, for example on surrounding objects of no interest or between the floor plate of the vehicle and the roadway, are gated in order to increase the measurement accuracy.

In accordance with a first variant, the position of the vehicle is determined from the shadowing produced by the vehicle for some of the radar receivers. To this end, the evaluation device may, for example, be configured to compare with one another the signal strengths of the received signals and to determine the position of the vehicle from the receiving positions of those radar receivers which have a weaker received signal. This makes it possible to roughly determine the vehicle position, which is all the more accurate the greater the number of radar receivers used.

A second variant is based on directed radar beams and the measurement of the reflections on the vehicle or surface thereof. To this end, the radar transmitter may, for example, transmit the radar beams directionally in a primary transmitting direction, which is inclined relative to the vertical, and the evaluation device is configured to compare with one another the signal strengths of the received signals and to determine the position of a surface of the vehicle from the receiving position of that radar receiver which has the strongest received signal. The accuracy of the measurement apparatus can be achieved by a stronger directing effect of the radar transmitter, that is to say stronger bundling of its radar beams in the primary transmitting direction, in addition to the measure of increasing the number of radar receivers.

Directed radar receivers can, for example, so be used in order to further increase the accuracy. To this end, each radar receiver may, for example, receive reflections predominantly in a primary receiving direction, which is inclined relative to the vertical, wherein the primary transmitting direction and the primary receiving directions lie in a common plane. The said common plane forms a measurement plane, within which the position of reflecting objects can be determined by identifying the radar receiver having the strongest received signal, more specifically all the more accurately the stronger the directing effect of the radar antennas of the radar transmitter and of the radar receivers and the higher the density of radar receivers, that is to say the greater the number of radar receivers provided.

The measurement apparatus can be used to measure different surfaces of a vehicle depending on the angular position of the said primary transmitting and receiving directions. In accordance with a first embodiment the primary receiving directions are parallel to one another and to the primary transmitting direction in order to determine the position of a substantially vertical surface of the vehicle; in accordance with an alternative embodiment the primary receiving directions are parallel to one another and are inclined to the primary transmitting direction in a mirror-inverted manner relative to the vertical in order to determine the position of a substantially horizontal surface of the vehicle. The first embodiment measures vertical surfaces, for example the side or end walls of a vehicle, via the detour of a secondary reflection on the substantially horizontal roadway (corner effect). The second embodiment directly measures the primary reflection on a horizontal surface, for example the roof or engine cover of the vehicle In both variants a time-of-flight measurement may additionally be taken if pulsed, modulated or coded radar beams are used, or interference measurements are taken on continuous wave radar beams. The evaluation device may thus, for example, be configured to take time-of-flight measurements between transmitted and received pulses and to determine from this the distance between the surface and one or more radar receivers in order to improve the position measurement. The time-of-flight measurements are, for example, pulse time-of-flight measurements between transmitted and received pulses, or time-of-flight measurements are taken in accordance with the FMCW method.

In an example embodiment, the primary transmitting and receiving directions of the radar transmitter and radar receivers can be changed during operation, for example by means of phase-controlled antenna arrays or by arbitrary selection of individual directional antennas. The position measurement accuracy can thus be increased further: by measuring in different directions, more measurement points can be measured with the same number of radar receivers, or alternatively the same number of measurement points with a lower number of radar receivers may be sufficient.

In accordance with a further example embodiment, the radar transmitter and the radar receivers are formed by radar transceivers, which can each be operated selectively as a radar transmitter or radar receiver in code, time or frequency multiplex. On the one hand the manufacturing and assembly outlay can thus be simplified because uniform components, specifically radar transceivers, can be assembled that are merely controlled and evaluated differently. On the other hand more measurement points can thus be measured using the same arrangement: the individual components may act selectively as transmitters or receivers at their respective assembly position, whereby more combination possibilities and therefore more measureable points in the measurement plane are produced.

The apparatus is suitable for all types of radar transmitters and receivers, whether pulse or CW radar, wherein the radar beams can also be modulated or coded in a wide range of manners. Very high-frequency radar beams, such as in the frequency range from 1 GHz to 100 GHz, including, for example, in the frequency range of 50 GHZ to 100 GHz, may be used in embodiments. This leads to very small antenna arrangements, which have heavily bundled directivities, even with small dimensions, and provides the possibility of mounting a plurality of lightweight transmitters and receivers or transceivers on a mounting gantry, which in turn can be dimensioned so as to be accordingly small and is therefore more cost effective than for conventional optical position measurement systems.

Further features and advantages, as well as the structure and operation of various embodiments, are described in detail below with reference to the accompanying drawings.

BRIEF DESCRIPTION OF THE DRAWINGS/FIGURES

The present subject matter will be explained in greater detail hereinafter on the basis of exemplary embodiments illustrated in the accompanying drawings, in which:

FIG. 1 schematically shows a first embodiment of the apparatus as viewed in the longitudinal direction of a roadway.

FIG. 2a shows the apparatus of FIG. 1 in plan view.

FIG. 2b shows an alternative embodiment of the apparatus of FIG. 1 in plan view.

Figure 3:
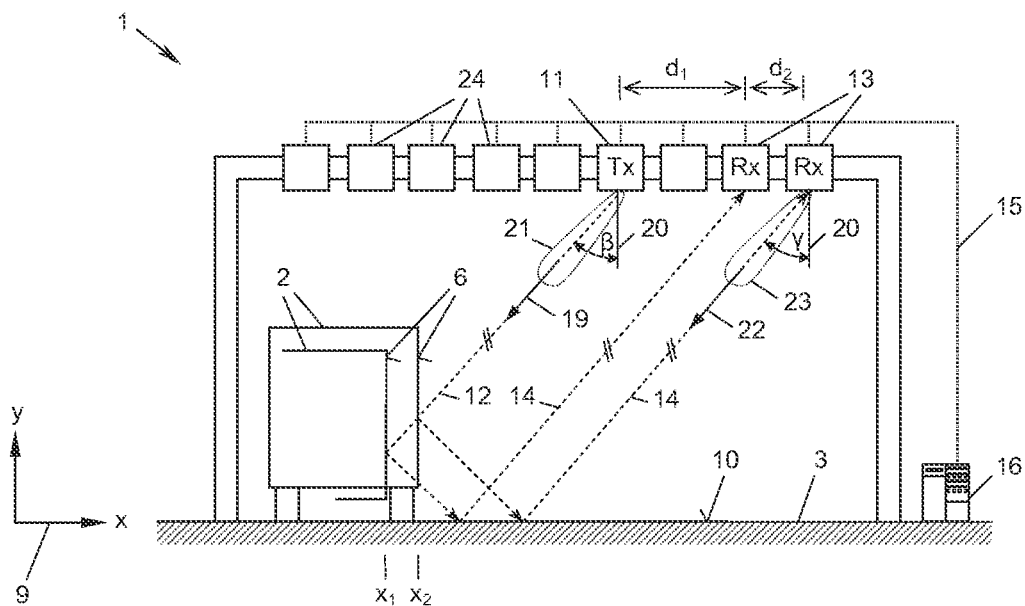
FIGS. 3 and 4 show the geometric conditions in the case of the measurement of a side face (FIG. 3) and roof (FIG. 4) of a vehicle with the aid of two further embodiments of the apparatus.

Embodiments will now be described with reference to the accompanying drawings.

DETAILED DESCRIPTION

An apparatus 1 for measuring the position of a vehicle 2 on a roadway 3 is shown in FIGS. 1 and 2a. The term "position" is understood here in its most general form and includes one, two or three of the coordinates x, y, z of any point P of the vehicle 2 or one of the surfaces thereof, for example a roof 4, side face 5, 6 or end face 7, 8, in a coordinate system 9. The coordinate system 9 is may, for example, be based on the position of the apparatus 1 with respect to the roadway 3; in the present example the plane 10 of the roadway 3 lies in the x/z plane of the coordinate system, the longitudinal direction of the roadway runs in the z direction, and the transverse direction of the roadway runs in the x direction; the y coordinate defines the height of a point P above the roadway plane 10.

The apparatus 1 comprises a radar transmitter 11, which is arranged in a transmitting position S above the plane 10 of the roadway 3 and transmits radar beams 12 downwardly, and also a plurality of radar receivers 13, which are arranged at various receiving positions $E_1$, $E_2$, ..., generally $E_i$, likewise above the roadway plane 10, and receive reflections 14 of the radar beams 12 from beneath. The radar receivers 13 convert the received reflected radar beams 14 into a received signal $R_1$, $R_2$, ..., generally $R_i$, (FIGS. 7 and 8), which they transmit via a line 15 to an evaluation device 16 for evaluation; the evaluation device 16 is also connected via the line 15 to the radar transmitter 11 in order to control said radar transmitter.

Each of the radar receivers 13 are arranged at distances $d_1$, $d_2$, ..., generally $d_i$, from the radar transmitter 11 and from one another, that is to say they are distributed above the plane 10. In the shown example, the radar transmitter 11 and all radar receivers 13 are mounted on a common mounting gantry 17 at a common mounting height h and in a common plane 18 spanning the roadway 3 transversely. The radar beams 12 and reflected radar beams 14 also run in this plane 18, which in this example constitutes the measurement plane of the apparatus 1. The radar transmitter 11 and the radar receivers 13 could also be mounted at individual, different heights $h_i$, and/or could be arranged at irregular distances $d_i$, and/or could not lie in a common plane; the latter facilitates the trigonometric calculations however.

The measurement plane 18 in which the radar beams 12, 14 lie, may also be inclined with respect to the x axis and/or rotated about the y axis, and more than one measurement plane 18 may also be provided. FIG. 2b shows an embodiment with two apparatus 1 of which the measurement planes 18 each run parallel to the y/z plane above a lane 3', 3" of the roadway 3 in order to measure positions of the vehicle 2 or end faces 7, 8 thereof in the longitudinal direction z of the roadway 3.

The radar transmitter 11 and radar receivers 13 can transmit and receive respectively any types or radar beams 12, 14 known in the art, for example CW radar beams or pulsed radar beams. The evaluation devices 16 may accordingly also perform conventional interference and/or pulse time-of-flight measurement methods on the radar beams 12, 14 in order to measure distances from the measurement points P.

The embodiment of FIG. 1 operates by the principle of detection of a shadowing of the radar beams 12 and 14 by an object located in the measurement plane 18, such as the vehicle 2. The evaluation device 16 for this purpose evaluates the signal strengths, for example amplitudes or received signal strengths (received signal strength indications, RSSIs) of the received signals $R_i$ of the various radar receivers 13 and compares these with one another for example or with predefined threshold values in order to determine the radar receiver(s) 13 which receives/receive a comparatively weaker or even no received signal $R_i$: in this case, the vehicle 2 covers the path of propagation from the radar transmitter 11 to said radar receiver 13.

In the knowledge of the transmitting and receiving positions S, $E_i$ (for example assembly heights h and distances $d_i$), and in the knowledge of the transmitting angle α, via which the radar transmitter 11 transmits its radar beams 12, it is thus possible to approximately determine the position of the vehicle 2 in the measurement plane 18. The more radar receivers 13 that are provided, that is to say the more densely these are arranged, the more accurately can the approximate position of the vehicle 2 be determined from the shadowing of one or more radar receivers 13.

The position measurement can be improved if the distance between a reflecting surface of the vehicle 2, here the roof 4 for example, and a radar receiver 13 is additionally measured, for example on the basis of interference measurements on CW radar beams or time-of-flight measurements on pulsed radar beams, from which additional information the shadowing information can be verified and improved in order to localise more accurately the position of the vehicle 2, for example of a reference point P thereof, in the measurement plane 18.

Figure 4:
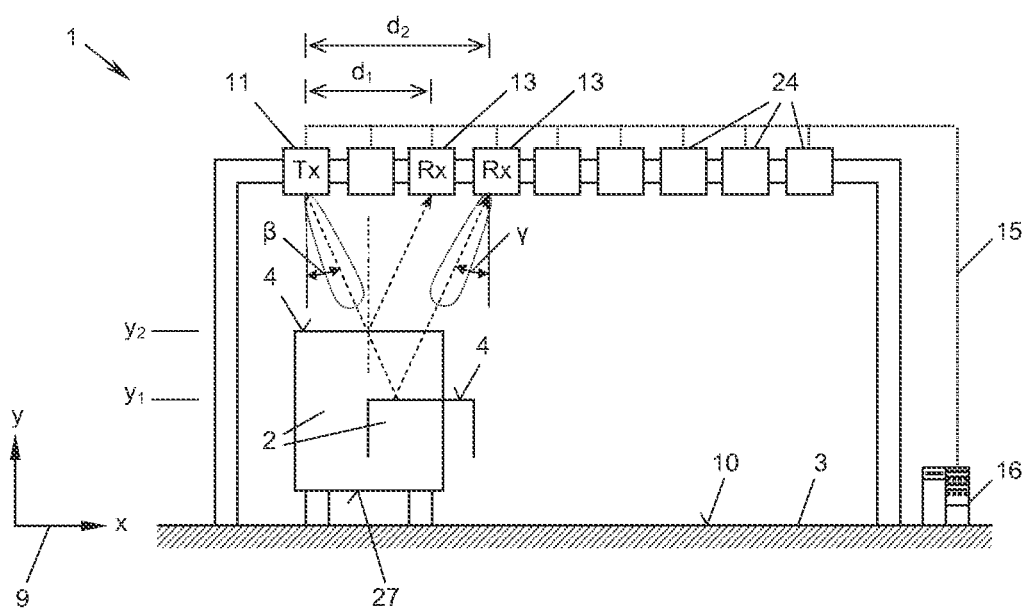

FIGS. 3 and 4 show a measuring principle of the apparatus 1 used alternatively or additionally to FIG. 1. In the embodiment of FIGS. 3 and 4, directed radar beams 12 are used, that is to say the radar transmitter 11 transmits its radar beams in a primary transmitting direction 19, which runs at an angle β to the vertical 20 in the measurement plane 18. Of course, radar beams 12 may not be bundled completely exactly in a single direction, but each radar antenna in practice has a lobe-shaped direction characteristic 21, wherein the central axis of the primary lobe 21 of the radar transmitter 13 is considered to be the primary transmitting direction 19. The opening or bundling angle of the transmitting lobe 21 depends on the directivity of the antenna of the radar transmitter 11, which is also defined by what is known as the "antenna gain", measured in dB. For example, a radar transmitter 11 with an antenna gain of 20 dB achieves good directivity with an opening angle (half width) of the transmitting lobe 21 of a few degrees or a few steradians. The stronger the directivity of the radar transmitter 11, that is to say the higher the antenna gain of the antenna thereof, the more radar energy lies in the primary transmission direction 19 and the more accurate is the position measurement described hereinafter, because more radar receivers 13 can be used at smaller distances $d_i$.

With use of radar transmitter 11 directed in this way, the position of a substantially vertical side face or end face 5-8 (FIG. 3) or of a substantially horizontal roof 4 (FIG. 4) of the vehicle 2 can now be measured in the measurement plane 18.

The measurement principle of FIG. 3 utilises the corner effect (cat's eye reflector effect) of a secondary reflection of the laser beam 12 at the plane 10 of the roadway 3, which forms an approximate right angle with the vertical surface to be measured, for example the side wall 5, 6 or end wall 7, 8. As shown in FIG. 3, the reflected laser beam 14 contacts different radar receivers 13 depending on the x position $x_1$, $x_2$ of the side wall 6 of the vehicle 2 with constant primary transmitting direction 19. Depending on the x position of the side face 6, a different radar receiver 13 thus receives the strongest received signal By evaluating the signal strengths of the received signals $R_i$ of the radar receivers 13 in the evaluation device 16, the radar receiver 13 that receives the strongest received signal $R_i$ can thus be determined. The position, here the x coordinate, of the side face 6 of the vehicle 2 in the coordinate system 9 can thus be determined from the known receiving position $E_i$ of this radar receiver 13 and the other known geometric dimensions, such as transmitting position S and angle β. This merely requires a simple trigonometric calculation of the geometric conditions shown in FIG. 3 and requires neither an evaluation of pulse time-of-flights nor a Doppler evaluation of the laser beams 12, 14. Of course, the position measurement result can also be improved additionally by optional consideration of time-of-flight and distance measurements at the laser beams 12, 14.

FIG. 4 shows the slightly modified principle of the measurement of a horizontal surface, such as the roof 4. As can be seen, the laser beam 12 emitted at the angle β in the primary transmitting direction 19 contacts different radar receivers 13 at different heights $y_1$, $y_2$ of the roof 4 of the vehicle 2, and therefore the position, here the y coordinate, of the roof 4 of the vehicle 2 can be calculated again from the receiving position $E_i$ of the radar receiver 13 that receives the greatest received signal $R_i$, and from the known values of transmitting position S and angle β by means of trigonometric calculation.

In the embodiments in FIGS. 3 and 4, the selection of the strongest received signal $R_i$ and therefore of the radar receiver 13 affected most severely by the reflected radar beam 14 can be improved by also equipping the radar receivers 13 with directional antennas, that is to say a primary receiving direction 22, which corresponds to the axis of a receiving lobe 23 of the respective radar receiver 13. In the embodiment of FIG. 3 the primary receiving direction 22, represented here by the angle γ to the vertical 20, is for this purpose set parallel to the primary transmitting direction 19 (β=γ); and in the embodiment of FIG. 4 the primary receiving direction 22 with respect to the vertical 20 is for this purpose set in a manner mirrored in relation to the primary transmitting direction 19 (γ=−β).

As can be seen from FIG. 3 and FIG. 4, a radar transceiver 24 can also be used for each of the radar transmitter and receivers 11, 13. In other words, a transceiver 24 is arranged at the transmitting and receiving positions S, $E_i$ and can be operated selectively just as a radar transmitter 11 and just a radar receiver 13. The selection of the operating mode of the respective transceiver 24 can be controlled here in time multiplex by the evaluation device 16, that is to say this selects the moment at which a transceiver 24 functions as a radar transmitter 11 or as a radar transceiver 13.

In an example embodiment, at any specific moment in time, only one of the transceivers 24 may be active as a radar transmitter 11 and all other transceivers may be active as radar receivers 13 (time multiplex method; TDMA, time division multiplex access). This is not absolutely necessary however; a plurality of radar transmitters 11 may also be operated simultaneously, for example at different frequencies (frequency multiplex method; FDMA, frequency division multiplex access) or by means of different orthogonal codings or modulations (code multiplex method; CDMA, code division multiple access), such that the apparatus 1 is composed of a plurality of "sub" apparatus 1 so to speak, that is to say in each case of a combination of a radar transmitter 11 and a number of radar receivers 13. It is also clear that the positions S of the radar transmitter 11 and $E_i$ of the radar receivers 13 are arbitrary and exchangeable above the plane 10 of the roadway 3 and are selected for the desired measurement arrangement, that is to say the desired region of measurement points in the measurement plane 13.

Figure 5:
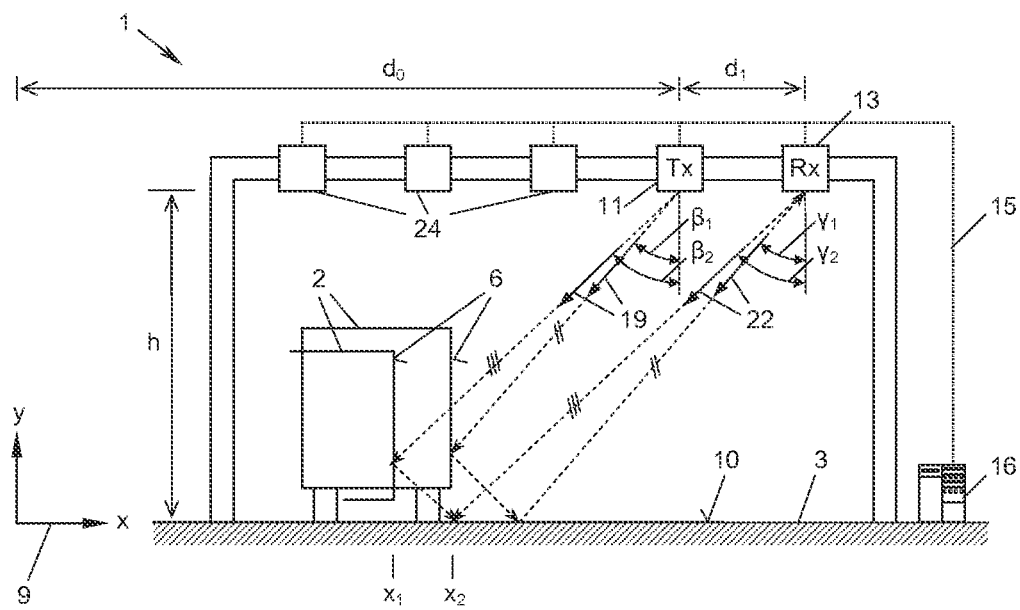
FIGS. 5 and 6 show the geometric conditions in the case of the measurement of a side face (FIG. 5) and roof (FIG. 6) of a vehicle with the aid of two further embodiments of the apparatus.
Figure 6:
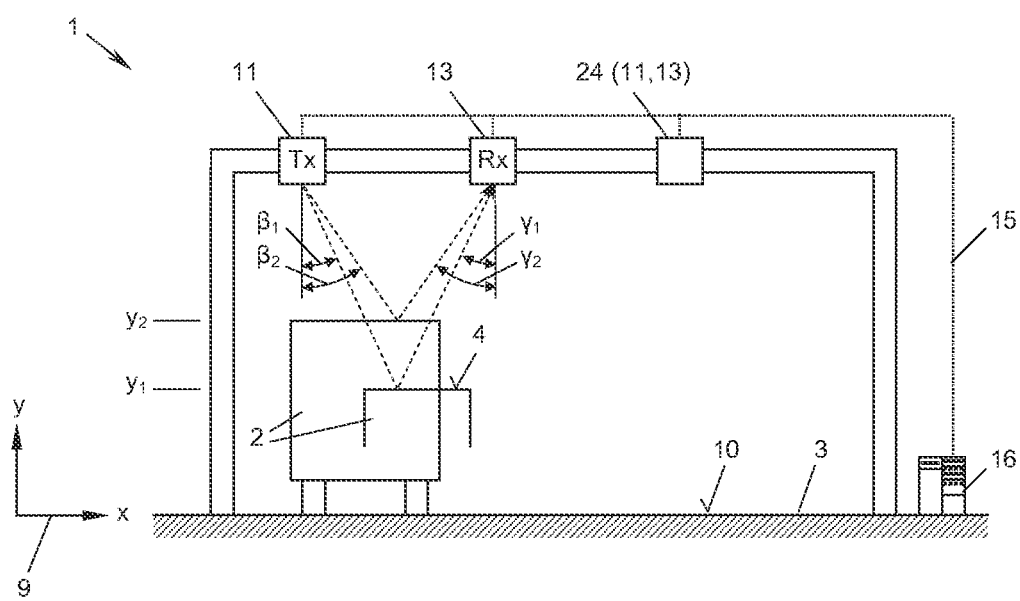

FIGS. 5 and 6 show a further measuring principle of the apparatus 1 in FIGS. 1 to 4, which can be used alternatively or additionally to the measuring principles of FIGS. 1 to 4. A pair (formed from the transceivers 24) of a radar transmitter 11 and a radar receiver 13, which are each equipped with directional antennas of which the direction can be controlled, is used in each of FIGS. 5 and 6: both the primary transmitting direction 19 of the radar transmitter 11 and the primary receiving direction 22 of the radar receiver 13 can be controlled, that is to say the respective angles thereof β and γ in the measurement plane 18 can be changed. Here, FIGS. 5 and 6 each show two exemplary angular positions $β_1$, $β_2$ and $γ_1$ and $γ_2$ of the primary transmitting and primary receiving directions 19, 22 respectively.

In FIG. 5, the primary transmitting and primary receiving directions 19, 22 are each selected in parallel in order to measure vertical surfaces 5-8 of the vehicle 2: $β_1=γ_i$ at a first moment in time $t_1$, and $β_2=γ_2$ at a second moment in time $t_2$. In the embodiment of FIG. 6, primary transmitting and primary receiving directions 19, 22 parallel with the vertical 20 are used to measure horizontal surfaces 4, that is to say $β_1=−γ_1$ at a first moment in time $t_1$, and $β_2=−γ_2$ at a second moment in time $t_2$. Of course, the primary transmitting and receiving directions 19, 22 of the radar transmitter 11 and of the radar receiver 13 can also be brought into further positions at further moments in time $t_3$, $t_4$ . . . , generally $t_i$; for example, the primary transmitting and primary receiving directions 19, 22 are pivoted over an angular range continuously or in a discretised manner.

Due to the successive use of different primary transmitting and receiving directions 19, 22 or angles β, γ, different measurement points in the measurement plane 18 can thus be "scanned"; the reflection on the surface to be measured 6 (FIG. 5) or 4 (FIG. 6) has clearly occurred in the angular position β, γ or primary transmitting and receiving direction 19, 22 in which the strongest received signal $R_i$ is received in the radar receiver 13. In the knowledge of the known transmitting and receiving positions S, $E_i$ of the radar transmitter 11 and radar receiver 13 (here: assembly height h and distances $d_i$), the x coordinate of the side wall 6 (FIG. 5) or the y coordinate of the roof 4 (FIG. 6) can then be calculated again by means of trigonometric calculations from the direction 19, 22 or β, γ thus found.

To control the direction of the radar transmitter and radar receivers 11, 13, these can be equipped for example with mechanically pivotable directional antennas, with a plurality of non-adjustable directional antennas that can each be selected in an arbitrary manner, or, for example, with phase-controlled antenna arrays (phased arrays), of which the latter, as is known to a person skilled in the art, develop directivity in a desired direction as a result of different phase control of a plurality of antennas arranged side by side. The directional control is also used not only to determine the position of an individual point, but to determine (to "scan") the position of an entire surface by pivoting the antenna radiation direction.

Instead of a chronologically successive use of different primary transmitting and primary receiving directions 19, 22 or angles β, γ, these can also be used simultaneously if the radar transmitter 11 and the radar receivers 13 each have a plurality of differently oriented directional antennas, as explained below in greater detail with reference to FIG. 8.

Of course, the embodiment in FIGS. 3 and 4 on the one hand and the embodiment in FIGS. 5 and 6 on the other hand can also be combined with one another. For example, in the case of the radar transmitter and receivers 11, 13 in the embodiment in FIGS. 5 and 6, of which the direction can be controlled, additional radar receivers 13 at other receiving positions $E_1$ can thus also be evaluated by the evaluation device 16, and the radar receiver 13 which guides the strongest received signal $R_i$ in a specific angular position β, γ is used for the trigonometric evaluation. The measurement range (the "aperture") of the measurement apparatus in FIGS. 5 and 6 can thus be widened, for example over the entire width of the roadway 3 (FIG. 2a) or over a longer longitudinal portion of the roadway (FIG. 2b). Conversely, in the embodiment in FIGS. 3 and 4, these directions β, γ can additionally be varied in order to obtain additional measurement or scanning points in the measurement plane 18 using the same number of radar receivers 13.

Figure 7:
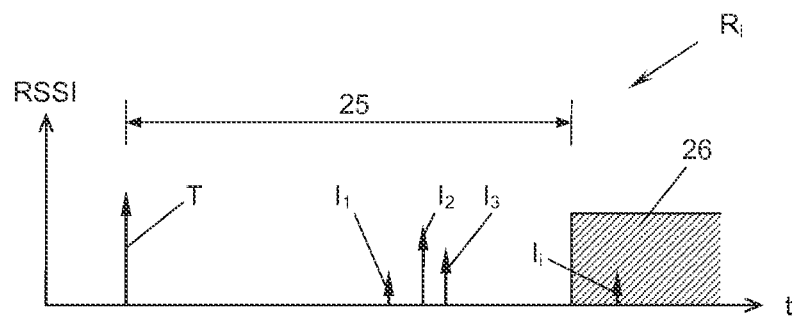
FIG. 7 shows a time graph of the range-gating embodiment of the apparatus.

FIG. 7 shows the principle of "range gating" by establishing a time window 25 after a transmitted pulse T of a pulsed radar beam 12. Only received pulses $I_1$ occurring in the received signals $R_i$ of the radar receivers 13 within the time window 25 are taken into consideration; a received pulse $I_4$ arriving after the time window 25 ("too late") within the subsequent gate window 26 is not taken into consideration, that is to say the evaluation device 16, when performing its signal strength comparison, ignores those received signals $R_i$ received by radar receivers 13 which relate to a received pulse outside the time window 25 after the associated transmitted pulse T. Similarly, other time-of-flight measurement principles, such as FMCW (frequency modulated continuous wave) methods, can also be applied for the "range gating", as is known to a person skilled in the art.

Multiple reflections of the radar beams 13, as occur for example on surrounding objects, such as the mounting gantry 17 or for example between the floor plate 27 of the vehicle 2 and the roadway 3, and lead to longer signal times-of-flight, can thus be gated, such that merely primary reflections on the vehicle 2 (FIGS. 1, 4 and 6) or primary and secondary reflections on the vehicle 2 and the roadway 3 (FIGS. 3 and 5) are taken into consideration in the measurement.

Figure 8:
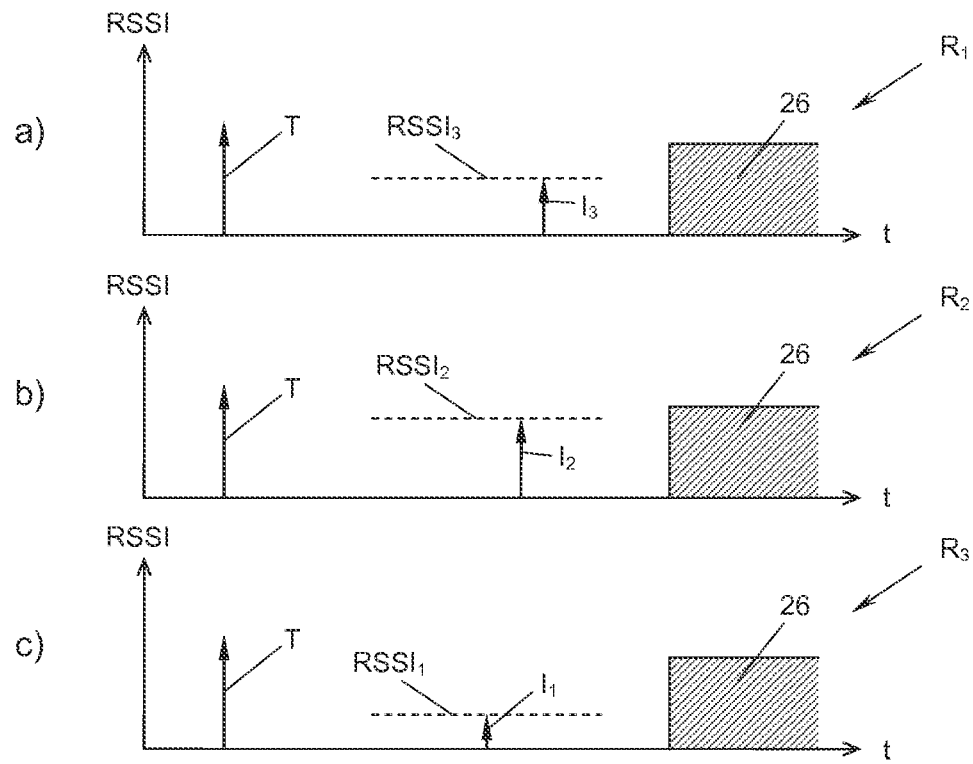
FIG. 8 shows a time diagram of the received signals within the scope of the apparatus according to FIGS. 5 and 6.

FIG. 8 shows the received signal $R_i$ of a single radar receiver 13 of the embodiment in FIGS. 5 and 6 in successive stages a, b, c, . . . of the measurement method, which each correspond to a different angular position β, γ of the primary transmitting and primary receiving directions 19, 22, over time t. As can be seen, received signals $R_1$, $R_2$, $R_3$ having different signal strengths $RSSI_3$, $RSSI_2$, $RSSI_1$ (or, in the case of pulsed radar beams, having received pulses $I_3$, $I_2$, $I_1$ of varying strength) occur at different angles $\gamma_1$; $\beta_2$, $\gamma_2$; $\beta_3$, $\gamma_3$. By plotting the received signals $R_i$ or pulses $I_i$ in the successive stages a, b, c and then comparing the signal strengths $RSSI_i$ or pulses $I_i$, the angular position $\beta_1$, $\gamma_i$ in which the maximum signal strength $RSSI_i$ occurs can now be determined. Again, the angles $\beta_1$, $\gamma_1$ are therefore found and the position of the surface 6 or 4 respectively to be measured can be calculated on the basis of the aforementioned trigonometric calculations.

In any embodiment in which the radar transmitter and receivers 11, 13 have a plurality of directional antennas oriented in the various angles $\beta_1$, $\gamma_1$; $\beta_2$, $\gamma_2$; $\beta_3$, $\gamma_3$, such that the aforementioned measurements can be carried out simultaneously in the various primary transmitting and primary receiving directions 19, 22, the received signals $R_i$ shown in FIG. 8 simultaneously constitute the received signals of various directional antennas a), b), c) . . . of the radar receiver 13. The received signals $R_i$ are thus obtained not in successive stages, but simultaneously at the outputs of various directional antennas a), b), c) . . . of the same radar receiver 13.

In this embodiment too, the directional antenna a), b), c) . . . of the radar receiver 13 and therefore the angular position $\gamma_i$ ($\gamma_i = \beta_i$ in FIG. 5; $\gamma_i = -\beta_i$ in FIG. 6) in which the maximum signal strength $RSSI_i$ occurs can again be determined by comparison of the signal strengths $RSSI_i$ or pulses $I_i$. The angles $\beta_i$ and $\gamma_i$ are thus found again and the position of the respective surface 6 or 4 to be measured can again be calculated on the basis of the aforementioned trigonometric calculations. This variant can also be combined with all of the aforementioned variants of the method and the apparatus.

CONCLUSION

The invention is accordingly not limited to the presented embodiments, but includes all variants, modifications and combinations of the presented measures falling within the scope of the accompanying claims.

What is claimed is:

1. An apparatus for measuring a position of a vehicle or a surface thereof on a roadway, comprising:
at least one radar transmitter, which is arranged in a transmitting position above the plane of the roadway and transmits radar beams downwardly,
a plurality of radar receivers, which are distributed above the plane of the roadway in different receiving positions at distances from one another, receive reflections of the radar beams from beneath, and each convert said reflections into a received signal, and
an evaluation device, which is connected to the radar transmitter and the radar receivers and is configured to compare with one another signal strengths of the received signals of the different radar receivers and thereby determine at least one radar receiver which has a weaker or a strongest received signal and measure said position of the vehicle or the surface thereof from the transmitting position as well as from the receiving position of the at least one determined radar receiver.

2. The apparatus according to claim 1, wherein the radar transmitter and the radar receivers lie in a common plane crossing the roadway.

3. The apparatus according to claim 1, wherein the radar transmitter transmits pulsed radar beams controlled by transmitted pulses and the received signals consequently contain received pulses, wherein the evaluation device is configured to take into account for said position measuring only those received signals of which the received pulses lie within a predefined time window after a transmitted pulse.

4. The apparatus according to claim 1, wherein the evaluation device is configured to determine in said comparison those radar receivers which have a weaker received signal.

5. The apparatus according to claim 1, wherein the radar transmitter transmits the radar beams directionally in a primary transmitting direction, which is inclined relative to the vertical, and in that the evaluation device is configured to determine in said comparison that radar receiver which has the strongest received signal.

6. The apparatus according to claim 5, wherein each radar receiver receives reflections predominantly in a primary receiving direction, which is inclined relative to the vertical, wherein the primary transmitting direction and the primary receiving directions lie in a common plane.

7. The apparatus according to claim 6, wherein the primary receiving directions are parallel to one another and to the primary transmitting direction in order to determine the position of a substantially vertical surface.

8. The apparatus according to claim 6, wherein the primary receiving directions are parallel to one another and are inclined to the primary transmitting direction in a mirror-inverted manner relative to the vertical, in order to determine the position of a substantially horizontal surface.

9. The apparatus according to claim 7, wherein the radar transmitter transmits pulsed radar beams controlled by transmitted pulses and the received signals consequently contain received pulses, wherein the evaluation device is configured to take into account for said position measuring only those received signals of which the received pulses lie within a predefined time window after a transmitted pulse, and wherein the evaluation device is configured to additionally take time-of-flight measurements between transmitted and received pulses and to determine from this the distance between the surface and one or more radar receivers, in order to improve the position measurement.

10. The apparatus according to claim 9, wherein the time-of-flight measurements between transmitted and received pulses are pulse time-of-flight measurements.

11. The apparatus according to claim 9, wherein the time-of-flight measurements between transmitted and received pulses are taken in accordance with the FMCW (frequency modulated continuous wave) method.

12. The apparatus according to claim 6, wherein the primary transmitting and receiving directions of the radar transmitter and of the radar receivers can be changed during operation.

13. The apparatus according to claim 1, wherein the radar transmitter and the radar receivers are each formed by a radar transceiver, which can be operated selectively as a radar transmitter or radar receiver in code, time or frequency multiplex.

14. The apparatus according to claim 1, wherein a frequency of the radar beams is 1 GHz to 100 GHz.

15. The apparatus according to claim 1, wherein a frequency of the radar beams is 50 GHz to 100 GHz.

16. The apparatus according to claim 2, wherein the radar transmitter and the radar receivers are mounted on a mounting gantry spanning the roadway transversely.

17. The apparatus according to claim 8, wherein the radar transmitter transmits pulsed radar beams controlled by transmitted pulses and the received signals consequently contain received pulses, wherein the evaluation device is configured to take into account for said position measuring only those received signals of which the received pulses lie within a predefined time window after a transmitted pulse, and wherein the evaluation device is configured to additionally take time-of-flight measurements between transmitted and received pulses and to determine from this the distance between the surface and one or more radar receivers, in order to improve the position measurement.

18. The apparatus according to claim 17, wherein the time-of-flight measurements between transmitted and received pulses are pulse time-of-flight measurements.

19. The apparatus according to claim 17, wherein the time-of-flight measurements between transmitted and received pulses are taken in accordance with the FMCW (frequency modulated continuous wave) method.

20. The apparatus according to claim 12, wherein the primary transmitting and receiving directions of the radar transmitter and of the radar receivers can be changed by means of phase-controlled antenna arrays or an arbitrary selection of individual directional antennas.

* * * * *